(12) United States Patent
Matsumura et al.

(10) Patent No.: US 6,676,740 B2
(45) Date of Patent: Jan. 13, 2004

(54) COATING COMPOSITION, COATING METHOD, AND COATED ARTICLE

(75) Inventors: Kazuyuki Matsumura, Gunma-ken (JP); Masaaki Yamaya, Gunma-ken (JP); Koichi Higuchi, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 106 days.

(21) Appl. No.: 09/876,130

(22) Filed: Jun. 8, 2001

(65) Prior Publication Data

US 2002/0010273 A1 Jan. 24, 2002

(30) Foreign Application Priority Data

Jun. 8, 2000 (JP) ........................................ 2000-172511

(51) Int. Cl.$^7$ ............................................ C09D 183/00
(52) U.S. Cl. .............................. 106/287.1; 106/287.13; 106/287.14; 106/287.16
(58) Field of Search .................. 106/287.14, 287.1, 106/287.13, 287.16

(56) References Cited

U.S. PATENT DOCUMENTS

| | | | |
|---|---|---|---|
| 4,439,557 A | | 3/1984 | Kawamura et al. |
| 4,746,366 A | | 5/1988 | Philipp et al. |
| 5,360,834 A | | 11/1994 | Popall et al. |
| 5,976,678 A | * | 11/1999 | Kawazu et al. ............. 428/208 |
| 6,235,101 B1 | * | 5/2001 | Kurosawa et al. ...... 106/287.14 |
| 6,326,087 B1 | * | 12/2001 | Nishiuchi et al. ............ 428/611 |
| 6,558,804 B2 | * | 5/2003 | Sato et al. ................... 428/447 |
| 6,582,620 B2 | * | 6/2003 | Miyadai et al. ............. 252/8.62 |

FOREIGN PATENT DOCUMENTS

| | | |
|---|---|---|
| EP | 0 373 451 A1 | 6/1990 |
| EP | 0 414 001 A2 | 2/1991 |
| EP | 0 528 353 A1 | 2/1993 |
| EP | 0 555 879 A1 | 8/1993 |
| JP | 5692059 | 7/1981 |
| JP | 01149878 A | 6/1989 |
| JP | 02048403 A | 2/1990 |
| JP | 05140507 A | 6/1993 |
| JP | 10324827 A | 12/1998 |
| JP | 11286652 A | 10/1999 |

OTHER PUBLICATIONS

CAPLUS 1988:475419, "Heat and weather–resistant anti-corrosive coating compositions", Ichikawa, Yoshio; 1988.*

* cited by examiner

*Primary Examiner*—David Brunsman
(74) *Attorney, Agent, or Firm*—Birch, Stewart, Kolasch & Birch, LLP

(57) ABSTRACT

A coating composition comprising (A) 100 parts by weight of an organosilicon compound having a hydrolyzable group-bearing silyl group, and (B) 0.1–50 parts by weight of a hydrolytic condensate of a reaction product and/or a mixture of a β-diketone with a mixture (b-1) of a titanium tetraalkoxide and an alkoxide of Zr, Fe, Al, Zn, In, Cu, Si, Sn, W or Mg. The coating composition is applied to plastic articles, especially of polycarbonate, to endow them with superior transparency, mar resistance, weather resistance, and chemical resistance. The coated articles find use in outdoor applications as windows and windshields on vehicles and building windows.

20 Claims, No Drawings

COATING COMPOSITION, COATING METHOD, AND COATED ARTICLE

This invention relates to coating compositions for forming mar and weather-resistant protective coatings on plastic substrates, typically polycarbonate resin substrates, a method for coating plastic substrates with the coating compositions, and coated articles having coatings thereof.

BACKGROUND OF THE INVENTION

As glazing substitutes, shatterproof or highly shatter resistant transparent materials have been widely utilized for these decades. For example, plastic substrates, especially polycarbonate resins have superior transparency, impact resistance and heat resistance and are currently used as structural members instead of glass in a variety of applications including building and vehicle windows and instrument covers.

The polycarbonate resins, however, are inferior to glass in surface properties such as mar resistance and weather resistance. It is desired to improve the surface properties of polycarbonate resin parts. Nowadays, polycarbonate resin parts for use as vehicle windows and acoustic barrier walls along highways are required to withstand more than 10 years of weathering.

Known means for improving the weather resistance of polycarbonate resin parts include the lamination of a weather resistant acrylic resin film on the surface of a polycarbonate resin substrate and the formation of a ultraviolet absorber-containing resin layer on the resin surface, for example, by co-extrusion.

For improving the mar resistance of polycarbonate resin parts, it is known to coat thermosetting resins such as polyorganosiloxanes and melamine resins and to coat photocurable resins such as polyfunctional acrylic resins.

As to the manufacture of transparent articles having both weather resistance and mar resistance, JP-A 56-92059 and JP-A 1-149878 disclose ultraviolet-absorbing transparent substrates having a primer layer loaded with a large amount of UV absorber added and a protective coating of colloidal silica-containing polysiloxane paint overlying the primer layer.

However, several problems arise with this approach. The addition of a large amount of UV absorber can adversely affect the adhesion to the substrate. During heat curing step, the UV absorber can volatilize off. On outdoor use over a long period of time, the UV absorber will gradually bleed out, causing whitening. From the mar resistance standpoint, it is impossible to add a large amount of UV absorber to the protective coating of colloidal silica-containing polysiloxane.

On the other hand, Japanese Patent Nos. 2,938,458 and 2,924,018, JP-A 11-286652 and JP-A 10-324827 attempt to enhance the curing properties and weather and abrasion resistance of coating compositions by adding thereto titanium chelate compounds or partial hydrolyzates thereof which play the catalytic role of promoting cure. Undesirably, these attempts rather detract from crack resistance by reason of over-curing, and tend to adversely affect storage stability.

SUMMARY OF THE INVENTION

An object of the invention is to provide a coating composition and method for forming a protective coating having improved mar and weather resistance. Another object is to provide a coated article having a mar and weather-resistant coating.

The inventors have found that a coating composition capable of achieving the above objects is obtained by blending an organosilicon compound having a hydrolyzable group-bearing silyl group with a hydrolytic condensate (sometimes referred to as final reaction product) of a reaction product and/or a mixture of a β-diketone with a mixture (b-1) containing a titanium tetraalkoxide and a metal alkoxide of the formula: $M(OR)_n$ wherein M is at least one metal selected from among Zr, Fe, Al, Zn, In, Cu, Si, Sn, W, and Mg, n is the valence of the metal, and R is an alkyl group of 1 to 10 carbon atoms or hydrogen.

Studying a coating composition for improving the mar and weather resistance of molded parts of thermoplastic resins such as polycarbonate, the inventors have discovered that when the final reaction product is added to the organosilicon compound, the resulting composition remains very stable over a long term. Especially the final reaction product is (1) the reaction product obtained by reacting in a solvent the mixture (b-1) of the titanium tetraalkoxide as a main component and the metal alkoxide with a β-diketone, followed by hydrolytic condensation, or (2) the reaction product obtained by subjecting the mixture (b-1) of the titanium tetraalkoxide as a main component and the metal alkoxide to hydrolytic condensation in a solvent containing a β-diketone. Unlike customary titanium oxide sol, the final reaction product is soluble in solvents, does not settle with the lapse of time, and remains stable in the mixture. When a coating is formed from the composition, very good transparency is provided as compared with the titanium oxide sol. Since the final reaction product takes a microparticulate structure and has β-diketone ligands left on particle surfaces, it imparts lubricity to the coating surface, significantly improving abrasion resistance as compared with the conventional titanium oxide sol-added coatings. Moreover, the final reaction product can act as a crosslinking catalyst to achieve nearly full-cure crosslinkage even under moderate curing conditions, leaving few uncrosslinked portions. Crack resistance is improved since the undesirable phenomenon that micro-cracks generate as a result of slow progress of crosslinking with time is eliminated.

Additionally, the final reaction product itself has a ultraviolet radiation absorbing capability, which eliminates the addition of or reduces the amount of an organic UV absorber, thereby removing the detrimental effects by bleeding-out of such absorber. Since there is no loss of UV absorbing capability which is otherwise caused by decomposition of organic UV absorbers, satisfactory weather resistance is kept over a long period of time. Continuing further study on the ratio and amounts of distinct components in the coating composition, the inventors has arrived at the present invention.

In one aspect, the invention provides a coating composition as defined below.

I) A coating composition comprising (A) 100 parts by weight of an organosilicon compound having a hydrolyzable group-bearing silyl group, and (B) 0.1 to 50 parts by weight of a hydrolytic condensate of a reaction product and/or a mixture of a β-diketone with a mixture (b-1) containing a titanium tetraalkoxide and a metal alkoxide of the formula: M(OR)N wherein M is at least one metal selected from the group consisting of Zr, Fe, Al, Zn, In, Cu, Si, Sn, W, and Mg, n is the valence of the metal, and R is an alkyl group of 1 to 10 carbon atoms or hydrogen.

II) The coating composition of I wherein component (A) is a silane compound of the formula (1):

$$R^3_a Si(R^4)_{4-a} \tag{1}$$

wherein $R^3$ is an alkyl, aryl, halogenated alkyl, halogenated aryl or alkenyl group of 1 to 10 carbon atoms or an organic group having an epoxy, (meth)acryloxy, mercapto, amino or cyano group, $R^4$ is an alkoxy, alkenyloxy, acyloxy or alkoxyalkoxy group of 1 to 10 carbon atoms, and "a" is 0, 1 or 2, and/or a hydrolyzate thereof.

III) The coating composition of I wherein component (A) is an organic copolymer of an alkoxysilyl group-containing acrylic and/or vinyl monomer and another monomer copolymerizable therewith, the content of the alkoxysilyl group-containing acrylic and/or vinyl monomer in the organic copolymer being 0.1 to 50% by weight.

IV) The coating composition of any one of I to III wherein component (B) is a hydrolytic condensate obtained by reacting in a solvent the mixture (b-1) with a β-diketone of the general formula: $R^1COCH_2COR^2$ wherein $R^1$ and $R^2$ are alkyl groups of 1 to 6 carbon atoms and may be the same or different, followed by hydrolytic condensation.

V) The coating composition of any one of I to III wherein component (B) is a hydrolytic condensate obtained by subjecting the mixture (b-1) to hydrolytic condensation in a solvent containing a β-diketone of the general formula: $R^1COCH_2COR^2$ wherein $R^1$ and $R^2$ are alkyl groups of 1 to 6 carbon atoms and may be the same or different.

VI) The coating composition of any one of I to V wherein the amount of the β-diketone is 0.5 to 2 molar equivalents based on the mixture (b-1).

VII) The coating composition of any one of I to VI wherein the amount of water used in hydrolytic condensation is 3.1 to 15 molar equivalents based on the mixture (b-1).

VIII) The coating composition of any one of I to VII wherein the mixture (b-1) contains 100 parts by weight calculated as $TiO_2$ of the titanium tetraalkoxide and 0.01 to 50 parts by weight calculated as oxide of the metal alkoxide.

IX) The coating composition of any one of I to VIII wherein component (B) is microparticulate metal oxide having a mean particle size of up to 100 nm and bearing β-diketone groups.

X) The coating composition of any one of I to IX wherein component (B) is capable of absorbing ultraviolet radiation having a wavelength of up to 350 nm.

XI) The coating composition of any one of I to X, further comprising (C) 0.1 to 100 parts by weight of a microparticulate inorganic oxide containing at least one atom selected from cerium and zinc and capable of absorbing radiation having a wavelength of up to 400 nm.

XII) The coating composition of any one of I to XI, further comprising (D) 1 to 200 parts by weight of colloidal silica.

XIII) The coating composition of any one of I to XII, further comprising 0.1 to 10 parts by weight of a photostabilizer having at least one cyclic hindered amine structure in a molecule.

It is understood that the coating composition of III is suitable as a primer whereas the coating composition of II is suitable to directly apply onto a substrate or to apply as a topcoat onto a primer coating.

In another aspect, the invention provides a coated article, that is, an article having a protective coating with improved weather resistance and abrasion resistance, the coating being formed from the coating composition defined above.

In a further aspect, the invention provides a coating method as defined below as well as a coated article obtained by the coating method.

XIV) A method for providing a plastic substrate with a weather and abrasion-resistant coating, comprising the steps of:
(i) applying an organic solvent solution of the coating composition of III onto a plastic substrate,
(ii) evaporating the organic solvent and curing the coating to form a primer layer,
(iii) applying the coating composition of II onto the primer layer, and
(iv) heating the coating of the coating composition at a temperature of 50 to 140° C. for curing.

XV) A method for providing a plastic substrate with a weather and abrasion-resistant coating, comprising the steps of:
(i) applying an organic solvent solution of the coating composition of III onto a plastic substrate,
(ii) evaporating the organic solvent and curing the coating to form a primer layer,
(iii) applying a colloidal silica-laden organopolysiloxane composition onto the primer layer, the organopolysiloxane composition comprising a hydrolyzate or co-hydrolyzate of an alkoxysilane of the following general formula (2):

$$R^7_e Si(OR^8)_{4-e} \tag{2}$$

wherein $R^7$ is selected from the class consisting of an alkyl group, aryl group, halogenated alkyl group, halogenated aryl group and alkenyl group of 1 to 10 carbon atoms, and an organic group having an epoxy, (meth)acryloxy, mercapto, amino or cyano group, $R^8$ is hydrogen or a monovalent organic group of 1 to 10 carbon atoms, and x is equal to 0, 1 or 2, and colloidal silica, and
(iv) heating the coating of the organopolysiloxane composition at a temperature of 50 to 140° C. for curing.

The plastic substrate is typically comprised of a polycarbonate resin.

DESCRIPTION OF THE PREFERRED EMBODIMENT

In a first embodiment of the invention, the coating composition contains
(A) 100 parts by weight of an organosilicon compound having a hydrolyzable group-bearing silyl group, and
(B) 0.1 to 50 parts by weight of a hydrolytic condensate of a reaction product and/or a mixture of a β-diketone with a mixture (b-1) containing a titanium tetraalkoxide and a metal alkoxide of the formula: $M(OR)_n$ wherein M is at least one metal selected from the group consisting of Zr, Fe, Al, Zn, In, Cu, Si, Sn, W, and Mg, n is the valence of the metal, and R is an alkyl group of 1 to 10 carbon atoms or hydrogen.

The organosilicon compound having a hydrolyzable group-bearing silyl group (A) is preferably component (A-1) or (A-2) shown below, though not limited thereto.

(A-1) a silane compound of the formula (1):

$$R^3_a Si(R^4)_{4-a} \tag{1}$$

wherein $R^3$ is an alkyl, aryl, halogenated alkyl, halogenated aryl or alkenyl group of 1 to 10 carbon atoms or an organic group having an epoxy, (meth)acryloxy, mercapto, amino or cyano group, $R^4$ is an alkoxy, alkenyloxy, acyloxy or alkoxyalkoxy group of 1 to 10 carbon atoms, and "a" is 0, 1 or 2, and/or a hydrolyzate thereof.

(A-2) an organic copolymer of an alkoxysilyl group-containing acrylic and/or vinyl monomer and another monomer copolymerizable therewith, the content of the alkoxysilyl group-containing acrylic and/or vinyl monomer in the organic copolymer being 0.1 to 50% by weight.

Now the components (A-1) and (A-2) are described in detail.

Component (A-1)

It is a silane compound of formula (1) and/or a (partial) hydrolyzate thereof.

Herein $R^3$ stands for alkyl groups, aryl groups, halogenated alkyl groups, halogenated aryl groups or alkenyl groups of 1 to 10 carbon atoms, or organic groups having an epoxy, (meth)acryloxy, mercapto, amino or cyano group. Examples include alkyl groups such as methyl, ethyl, propyl, isopropyl, butyl, hexyl, decyl and cyclohexyl; aryl groups such as phenyl and phenethyl; halogenated alkyl groups such as 3-chloropropyl, 3,3,3-trifluoropropyl, and 3,3,4,4,5,5,6,6-nonafluorohexyl; halogenated aryl groups such as p-chlorophenyl; alkenyl groups such as vinyl, allyl, 9-decenyl and p-vinylbenzyl; epoxy group-containing organic groups such as 3-glycidoxypropyl, β-(3,4-epoxycyclohexyl)ethyl and 9,10-epoxydecyl; (meth)acryloxy group-containing organic groups such as γ-methacryloxypropyl and γ-acryloxy; mercapto group-containing organic groups such as γ-mercaptopropyl and p-mercaptomethylphenylethyl; amino group-containing organic groups such as γ-aminopropyl and (β-aminoethyl)-γ-aminopropyl; and cyano group-containing organic groups such as β-cyanoethyl.

$R^4$ stands for alkoxy, alkenyloxy, acyloxy or alkoxyalkoxy groups of 1 to 10 carbon atoms, for example, methoxy, ethoxy, propoxy, isopropoxy, butoxy, isopropenoxy and methoxyethoxy.

The letter "a" is equal to 0, 1 or 2. The silane compound used herein functions as a binder having a bonding ability.

Illustrative, non-limiting, examples of the silane compounds that satisfy the above conditions include trialkoxy or triacyloxysilanes such as methyltrimethoxysilane, methyltriethoxysilane, methyltris(2-methoxyethoxy) silane, methyltriacetoxysilane, methyltripropoxysilane, methyltriisopropenoxysilane, methyltributoxysilane, ethyltrimethoxysilane, ethyltriethoxysilane, vinyltrimethoxysilane, vinyltriethoxysilane, vinyltriacetoxysilane, vinyltris(2-methoxyethoxy) silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, γ-(3,4-epoxycyclohexyl)ethyltrimethoxysilane, γ-(3,4-epoxycyclohexyl)ethylmethyldimethoxysilane, β-(3,4-epoxycyclohexyl)ethyltriethoxysilane, β-(3,4-epoxycyclohexyl)-ethylmethyldiethoxysilane, γ-methacryloxypropyltrimethoxysilane, γ-acryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-(β-aminoethyl)-γ-aminopropyltrimethoxysilane, and β-cyanoethyltrimethoxysilane;

dialkoxysilanes or diacyloxysilanes such as dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, γ-glycidoxypropylmethyldimethoxysilane, γ-glycidoxypropylmethyldiethoxysilane, γ-glycidoxypropylmethyldipropoxysilane, 3,3,3-trifluoropropylmethyldimethoxysilane, γ-methacryloxypropylmethyldimethoxysilane, γ-acryloxypropylmethyldimethoxysilane, γ-aminopropylmethyldimethoxysilane, γ-aminopropylmethyldiethoxysilane, γ-mercaptopropylmethyldimethoxysilane, γ-mercaptopropylmethyldiethoxysilane, N-(β-aminoethyl)-γ-aminopropylmethyldimethoxysilane, and γ-cyanoethylmethyldimethoxysilane; and tetraalkoxysilanes such as methyl silicate, ethyl silicate, n-propyl silicate, n-butyl silicate, sec-butyl silicate, and t-butyl silicate.

Partial or complete hydrolyzates of these silane compounds are also useful. These silane compounds and/or hydrolyzates thereof may be used alone or in admixture of two or more.

The (partial) hydrolyzates of the above silane compounds are obtained, for example, by adding water to a lower alcohol solution of the silane compound in the presence of an acid catalyst and effecting hydrolysis. Exemplary lower alcohols are methanol, ethanol, isopropanol and butanol. Solvents compatible with these alcohols include ketones such as acetone and acetylacetone, esters such as ethyl acetate and isobutyl acetate, and ethers such as propylene glycol monomethyl ether, dipropylene glycol monomethyl ether, and diisopropyl ether.

Component (A-2)

It is an organic copolymer resin of an alkoxysilyl group-containing acrylic and/or vinyl monomer and another monomer copolymerizable therewith. Owing to the alkoxysilyl groups introduced, the coating composition is improved in adhesion to substrates. Crosslinking of alkoxysilyl groups together improves heat resistance and imparts durability. If the content of the alkoxysilyl group-containing monomer is less than 0.1% by weight, heat resistance and durability are not improved. If the content of the alkoxysilyl group-containing monomer is more than 50% by weight, the copolymer would become too hard, losing adhesion. Therefore, the content of the alkoxysilyl group-containing acrylic and/or vinyl monomer is 0.1 to 50%, preferably 1 to 40%, and more preferably 5 to 30% by weight based on the total weight combined with the other monomer.

Examples of the alkoxysilyl group-containing acrylic monomer include 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-acryloxypropyltrimethoxysilane, 3-acryloxypropyltriethoxysilane, 3-acryloxypropylmethyldimethoxysilane, 3-acryloxypropylmethyldiethoxysilane, 3-methacryloxymethyltrimethoxysilane, 3-methacryloxymethyltriethoxysilane, 3-methacryloxymethylmethyldimethoxysilane, 3-methacryloxymethylmethyldiethoxysilane, 3-acryloxymethyltrimethoxysilane, 3-acryloxymethyltriethoxysilane, 3-acryloxymethylmethyldimethoxysilane, and 3-acryloxymethylmethyldiethoxysilane. Of these, 3-methacryloxypropyltrimethoxysilane, 3-methacryloxypropylmethyldimethoxysilane, 3-acryloxypropyltrimethoxysilane, and 3-acryloxypropylmethyldimethoxysilane are preferred for ease of handling, crosslinked density and reactivity.

Examples of the alkoxysilyl group-containing vinyl monomer include vinyltrimethoxysilane, vinyltriethoxysilane, vinyltris(2-methoxyethoxy)silane, vinylmethyldimethoxysilane, vinylmethyldiethoxysilane, vinylmethylbis(2-methoxyethoxy)silane, 3-vinyloxypropyltrimethoxysilane, 3-vinyloxypropyltriethoxysilane, 3-vinyloxypropylmethyldimethoxysilane, 3-vinyloxypropylmethyldiethoxysilane, styryltrimethoxysilane, styryltriethoxysilane, styrylmethyldimethoxysilane, and styrylmethyldiethoxysilane. Of these, vinyltrimethoxysilane, vinyltriethoxysilane, and 3-vinyloxypropyltrimethoxysilane are preferred for ease of handling and reactivity.

Examples of the other monomer copolymerizable with the alkoxysilane monomer include alkyl methacrylates such as methyl methacrylate, butyl methacrylate, and 2-ethylhexyl methacrylate; alkyl acrylates such as methyl acrylate, ethyl acrylate, and butyl acrylate; vinyl ethers such as glycidyl methacrylate, acrylamide, acrylonitrile, vinyl acetate, ethyl vinyl ether, butyl vinyl ether, and hexyl vinyl ether; styrene and ethylene glycol dimethacrylate; methacrylic group-containing benzotriazoles serving as a UV absorber such as 2-(2'-hydroxy-5'-methacryloxyethylphenyl)-2H-benzotriazole; and methacrylic group-containing hindered amines serving as a photo-stabilizer such as 2,2,6,6-tetramethyl-4-piperidinyl methacrylate and 1,2,2,6,6-pentamethyl-4-piperidinyl methacrylate. It is noted that compounds having a group capable of reacting with the alkoxysilyl group, for example, 2-hydroxyethyl methacrylate are undesirable since they can cause the coating composition to change with time, typically thickening or gelling. Preferred for this reason are those compounds free of a hydroxyl or similar group capable of reacting with the alkoxysilyl group.

The organic copolymer is a copolymer of the alkoxysilyl group-containing monomer with the other monomer copolymerizable therewith. The copolymer is readily obtained by adding a radical polymerization initiator to a 5 solution of the monomers, followed by heating to effect reaction. The initiator is selected from peroxides such as dicumyl peroxide and benzoyl peroxide and azo compounds such as azobisisobutyronitrile.

Component (B)

Component (B) is a hydrolytic condensate (final reaction product) of the reaction product of a β-diketone with a mixture (b-1) and/or a mixture of a β-diketone with a mixture (b-1). The mixture (b-1) contains a titanium tetraalkoxide and a metal alkoxide of the formula: $M(OR)_n$ wherein M is at least one metal selected from the group consisting of Zr, Fe, Al, Zn, In, Cu, Si, Sn, W, and Mg, n is the valence of the metal, and R is an alkyl group of 1 to 10 carbon atoms or hydrogen.

The final reaction product is (1) a hydrolytic condensate obtained by reacting in a solvent the mixture (b-1) with a β-diketone of the general formula: $R^1COCH_2COR^2$ wherein $R^1$ and $R^2$ are alkyl groups of 1 to 6 carbon atoms and may be the same or different, followed by hydrolytic condensation; or (2) a hydrolytic condensate obtained by subjecting the mixture (b-1) to hydrolytic condensation in a solvent containing a β-diketone of the general formula: $R^1COCH_2COR^2$ wherein $R^1$ and $R^2$ are as defined above.

Illustrative examples of the titanium alkoxide and the metal alkoxide $M(OR)_n$ include tetra-i-propoxytitanium, tetra-n-butoxytitanium, tetrakis(2-ethylhexyloxy)titanium, tetrastearyloxytitanium, tetraethoxyzirconium, tetra-i-propoxyzirconium, tetra-n-butoxyzirconium, tetra-sec-butoxyzirconium, tetra-t-butoxyzrconium, tetra-n-pentoxyzirconium, tetrakis(2-ethylhexyloxy)zirconium, tetrastearyloxyzirconium, triethoxyaluminum, tri-i-propoxyaluminum, mono-sec-butoxy-propoxyaluminum, tri-sec-butoxy-aluminum, triethoxyiron (III), tri-i-propoxyiron (III), tri-i-propoxyindium, pentaethoxytungsten, hexaethoxytungsten, tetramethoxysilane, and tetraethoxysilane. Oligomers of these titanium alkoxides and metal alkoxides are also useful. In the mixture (b-1) of titanium tetraalkoxide and metal alkoxide $M(OR)_n$, titanium and the other metal are preferably contained in such amounts that there are present 100 parts by weight calculated as $TiO_2$ of the titanium tetraalkoxide and 0.01 to 50 parts, especially 0.1 to 30 parts by weight calculated as oxide of the metal alkoxide. If the amount of the metal alkoxide other than titanium is more than 50 parts, the UV-absorbing effects of titanium can be retarded. If the metal alkoxide $M(OR)_n$ is not present at all, the titanium tetraalkoxide alone imparts insufficient weather resistance and abrasion resistance.

The β-diketone is of the general formula:

$$R^1COCH_2COR^2$$

wherein $R^1$ and $R^2$, which may be the same or different, are alkyl groups of 1 to 6 carbon atoms. Exemplary groups of $R^1$ and $R^2$ are methyl, ethyl, n-propyl, i-propyl, n-butyl, sec-butyl, t-butyl, and hexyl. Illustrative examples of the β-diketone include acetylacetone, 2,4-hexanedione, 2,4-heptanedione, 3,5-heptanedione, 2,4-octanedione, 2,4-nonanedione, 5-methylhexanedione, 2,2,6,6-tetramethyl-3,5-heptanedione. Of these, acetylacetone is most preferred. These β-diketones may be used alone or in admixture of two or more.

In the practice of the invention, component (B) or final reaction product is obtained (1) by reacting in a solvent the mixture (b-1) with the β-diketone, followed by hydrolytic condensation; or (2) by subjecting the mixture (b-1) to hydrolytic condensation in a solvent containing the β-diketone.

The blending ratio of the mixture (b-1) and the β-diketone is preferably such that there are 1 mol of the mixture (b-1) and 0.5 to 2 mol, more preferably 0.7 to 1.0 mol of the β-diketone. If the molar ratio of β-diketone to mixture (b-1) is less than 0.5, gelation can occur or stability be exacerbated during the subsequent hydrolytic condensation. If the molar ratio of β-diketone to mixture (b-1) is more than 2, the subsequent hydrolytic condensation can be retarded, sometimes failing to provide an appropriate coating composition or inviting an economical disadvantage.

The solvents used herein are preferably alcohols and low-boiling organic solvents having a boiling point of lower than 120° C. The alcohols are monohydric alcohols and dihydric alcohols. Of the monohydric alcohols, saturated aliphatic alcohols having 1 to 8 carbon atoms are preferred. Suitable alcohols are exemplified by methanol, ethanol, n-propyl alcohol, i-propyl alcohol, n-butyl alcohol, sec-butyl alcohol, t-butyl alcohol, ethylene glycol, diethylene glycol, triethylene glycol, ethylene glycol monobutyl ether, and ethylene glycol monoethyl ether acetate. Exemplary low-boiling organic solvents having a boiling point of lower than 120° C. are acetone, methyl ethyl ketone and tetrahydrofuran.

In procedure (1), the mixture (b-1) is first reacted with the β-diketone. The reaction is preferably effected at a temperature of about 20 to 120° C. for a time of about 1 to 10 hours. The resulting reaction product is a mixture of compounds of the following formula (b-2).

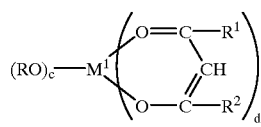

Herein, $M^1$ is Ti, Zr, Fe, Al, Zn, In, Cu, Si, Sn, W or Mg. The inclusion of a compound of formula (b-2) wherein $M^1$ is Ti in the mixture is essential. R is as defined above. The letter c is from 2 to 3.5 on the average, d is from 0.5 to 2 on the average, and c+d=n wherein n is the valence of the metal $M^1$.

It is noted that the compounds of formula (b-2) or the mixture thereof may be commercial products if any. In the mixture of compounds of formula (b-2), there can be co-present a titanium tetraalkoxide and/or another metal alkoxide $M(OR)_n$.

In procedures (1) and (2), hydrolytic condensation is preferably effected by adding 3.1 to 15 molar equivalents of water is added per molar equivalent of the mixture (b-1). A more appropriate amount of water is 3.4 to 8.0 molar equivalents. With less than 3.1 molar equivalents of water, the reaction product may have a weak UV absorbing capability probably because of failure to take microparticulate shape. More than 15 molar equivalents of water can cause gelation.

For the hydrolytic condensation, reaction is preferably carried out at a temperature of about 20 to 120° C. for a time of about 1 to 30 hours. More preferably, reaction is preferably carried out at a temperature of about 60 to 90° C. for a time of about 5 to 20 hours. Further preferably, hydrolytic condensation is carried out under acidic or basic conditions. To this end, any of well-known acidic catalyst and basic catalysts may be used. Suitable acidic catalysts are acidic hydrogen halides, carboxylic acids and sulfonic acids. Illustrative examples are hydrochloric acid, nitric acid, sulfuric acid, acetic acid, and maleic acid. Preferred basic catalysts are amine catalysts, with illustrative examples including ammonia, dimethylamine and diethylamine.

The thus obtained hydrolytic condensate or final reaction product as component (B) is in the form of metal oxide microparticulates having a mean particle size of up to 100 nm and bearing β-keto ester groups (β-diketone groups) and preferably capable of absorbing ultraviolet radiation of shorter than 350 nm.

In the coating composition of the invention, there are present 100 parts by weight as solids of component (A) and 0.1 to 50 parts by weight of effective solids of the hydrolytic condensate (B). An appropriate amount of the hydrolytic condensate (B) is at least 1 part, especially at least 2 parts by weight, but up to 50 parts, especially up to 30 parts by weight. More than 50 parts by weight of (B) is economically disadvantageous whereas less than 0.1 part by weight of (B) fails to achieve the desired weather and abrasion resistance.

Component (C)

In the coating composition of the invention, a microparticulate inorganic oxide may be blended as an optional component (C). This component is also designated an inorganic UV absorber since it is a microparticulate inorganic oxide capable of absorbing detrimental light rays with a wavelength of up to 400 nm which can cause decomposition and degradation of organic compounds. Since oxides of cerium and zinc have an ability to absorb light rays of up to 400 nm in wavelength, the microparticulate inorganic oxide must contain at least one of cerium and zinc. If necessary, a metal oxide other than the above-described ones is added to the inorganic oxide particles in any desired manner for the purpose of stabilizing the particles or improving weather resistance, and as long as the light absorbing ability is not impaired. The manner of adding the other metal oxide includes simple addition, mechanical adsorption of the other metal oxide to the periphery of inorganic oxide particles, coating of inorganic oxide particles on their surface with a thin film of the other metal oxide, formation of mixed crystals by the sol-gel method, and doping of inorganic oxide particles with the other metal oxide in crystal form. Examples of the other metal include Si (silica), Al (alumina), Sn (tin oxide), Zr (zirconia), Sb (antimony oxide), Fe (iron oxide), and rare earth metals (rare earth metal oxides) though not limited thereto. Of these, oxides of Si, Al, Sn and Zr are preferred.

The inorganic oxide particles (C) should preferably have a particle size of 1 to 300 nm, more preferably 1 to 200 nm. Particles with a size of greater than 300 nm may adversely affect light transmission. Particles with a size of less than 1 nm are inadequate since they are unstable and difficult to prepare. The inorganic oxide particles may be used in the form of powder, water dispersion or organic solvent dispersion.

In the coating composition, preferably 0.1 to 100 parts, more preferably 1 to 80 parts by weight of the inorganic oxide particles (C) is blended with 100 parts by weight as solids of component (A). Less than 0.1 part of component (C) may fail to achieve its additive effects or its combined effects with component (B). Blending of more than 100 parts of component (C) may adversely affect film strength and film transparency and is uneconomical.

Component (D)

In the coating composition, colloidal silica is preferably blended as an optional component (D). Colloidal silica is blended in an amount of 1 to 200 parts, especially 10 to 150 parts by weight of per 100 parts by weight of component (A). One exemplary blending procedure is by mixing 20 to 90 parts by weight of component (A) with 10 to 80 parts by weight as solids of a colloidal silica containing silica fines having a particle size of 1 to 100 nm to a total amount of 100 parts by weight. The mixture is diluted with alcohol, water or water-miscible solvent to a nonvolatile concentration of 15 to 20% by weight. The dilution is ripened at room temperature for about 3 to 5 days or at 40 to 60° C. for about 10 to 15 hours. The term "colloidal silica" is a dispersion of silica fines in water or an alcohol such as methanol, ethanol, isobutanol or diacetone alcohol.

Also, upon the above-described hydrolysis, the colloidal silica may be added along with the acid catalyst. To the colloidal silica-laden coating composition, a buffer solution and a curing catalyst are preferably added so as to provide adequate abrasion resistance.

Examples of the curing catalyst include dimethylamine, acetic ethanol amine, formic dimethylaniline, benzoic acid, tetraethylammonium salts, sodium acetate, sodium propionate, sodium formate, trimethylammonium benzoyl acetate, tetra-i-propoxytitanium, tetra-n-butoxytitanium, aluminum triisobutoxide, aluminum triisopropoxide, aluminum acetylacetonate, aluminum perchlorate, aluminum chloride, cobalt octylate, cobalt acetylacetonate, zinc octylate, zinc acetylacetonate, iron acetylacetonate, tin acetylacetonate, dibutyltin octylate, and dibutyltin laurate. An appropriate amount of the curing catalyst added is 0.02 to 0.4 part by weight per 100 parts by weight as solids of the colloidal silica-laden protective coating composition.

From the standpoint of insuring stability, the coating composition is preferably adjusted to pH 2 to 7, at which silanol groups remain stable, and especially pH 3 to 6. The buffer used for pH adjustment may be a combination of acidic and basic compounds, for example, a combination of acetic acid and sodium acetate and a combination of disodium hydrogen phosphate and citric acid.

If the coating composition has a too low viscosity to apply and thus forms only a thin coating, an acrylic polymer may be added as a component capable of imparting flexibility without detracting from adhesion. Such useful acrylic polymers include poly(alkyl methacrylates) and poly(alkyl acrylates) such as poly(methyl methacrylate), poly(butyl methacrylate), and poly(butyl acrylate), and copolymers thereof. These acrylic polymers are effective for imparting flexibility to the primer coating composition using the organic copolymer (A-1) without detracting from adhesion. The amount of the acrylic polymer added is desirably limited to 30% by weight or less based on the entire primer coating composition since more than 30% by weight of the acrylic polymer can preclude the composition from heat curing.

In the coating composition, a compound containing a nitrogen atom and an alkoxysilyl group in a molecule may be added for the purposes of assisting the composition in forming a satisfactory bond having water resistance, and fixing within the coating the optional photo-stabilizer by crosslinking with alkoxysilyl groups in the organic copolymer (A-2). Preferably the compound contains at least one nitrogen atom and at least two alkoxysilyl groups in a molecule.

Preferred examples of the compound used herein include an amino group-containing alkoxysilane, amide group-containing alkoxysilane, one obtained by reacting an amino group-containing alkoxysilane with an epoxy group-containing alkoxysilane and a silylating agent and amidating the reaction product, the reaction product of an amino group-containing alkoxysilane with a polyfunctional (meth) acrylic compound, the reaction product of an amino group-containing alkoxysilane with a (meth)acrylic compound, the reaction product of an amino group-containing alkoxysilane with a (meth)acrylic group-containing alkoxysilane, the reaction product of a polyamine compound with a (meth) acrylic group-containing alkoxysilane, one obtained by reacting an amino group-containing alkoxysilane with a polyfunctional isocyanate compound and amidating the reaction product, one obtained by reacting an amino group-containing alkoxysilane with an isocyanate group-containing alkoxysilane and amidating the reaction product, and the reaction product of a thiol group-containing alkoxysilane with an isocyanate group-containing alkoxysilane. Of these, preferred is the one obtained by reacting an amino group-containing alkoxysilane with an epoxy group-containing alkoxysilane and a silylating agent and amidating the reaction product.

Illustrative examples of the components used herein are described. Examples of the amino group-containing alkoxysilane include 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, 3-(trimethoxysilylpropyl)-aminopropyltrimethoxysilane, 3-(triethoxysilylpropyl)-aminopropyltriethoxysilane, 2-(trimethoxysilylpropyl)-aminoethyl-3-aminopropyltrimethoxysilane, and 2-(triethoxysilylpropyl) aminoethyl-3-aminopropyltriethoxysilane.

Examples of the amide group-containing alkoxysilane include ureidopropyltrimethoxysilane, ureidopropyltriethoxysilane, ureidopropylmethyldimethoxysilane, and ureidopropylmethyldiethoxysilane.

The process of obtaining the amide compound by reacting an amino group-containing alkoxysilane with an epoxy group-containing alkoxysilane and a silylating agent and amidating the reaction product is described below. The amino group-containing alkoxysilane is as exemplified above although N-(2-aminoethyl)-3-aminopropyltrimethoxysilane and N-(2-aminoethyl)-3-aminopropylmethyldimethoxysilane are preferred for adhesion and operation. Illustrative examples of the epoxy group-containing alkoxysilane include γ-glycidoxypropyltrimethoxysilane, γ-glycidoxypropylmethyldimethoxysilane, γ-glycidoxypropyltriethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, and β-(3,4-epoxycyclohexyl)ethylmethyldiethoxysilane. From the standpoints of reactivity and ease of operation, the preferred silane compounds are γ-glycidoxypropyltrimethoxysilane, γ-glycidoxypropylmethyldimethoxysilane, and β-(3,4-epoxycyclohexyl)ethylmethyldimethoxysilane.

Examples of the silylating agent include hexamethyldisilazane, N,N'-bis(trimethylsilyl)formamide and N,N'-bis(trimethylsilyl)urea. When the amino group-containing alkoxysilane reacts with an epoxy group-containing alkoxysilane, the silylating agent serves to protect the OH groups generated by the reaction for preventing reaction between OH groups and alkoxysilyl groups, thereby precluding a change with time of the reaction product.

Reaction of the amino group-containing alkoxysilane with the epoxy group-containing alkoxysilane and the silylating agent may be effected by adding dropwise the epoxy group-containing alkoxysilane to a mixture of the amino group-containing alkoxysilane and the silylating agent and heating the mixture for reaction. Alternatively, the amino group-containing alkoxysilane is reacted with the epoxy group-containing alkoxysilane, and the silylating agent is added to the reaction product for further reaction.

In this reaction, the amino group-containing alkoxysilane and the epoxy group-containing alkoxysilane are preferably used in such amounts that the molar ratio of epoxy groups to amino (=N—H) groups may range from 0.3/1 to 1.2/1. If the molar ratio of epoxy/amino is less than 0.3, only a less number of alkoxy groups per molecule participate in crosslinking, leading to short cure, and the entire molecule is not spread, leading to a weak surface bond. If the molar ratio of epoxy/amino is more than 1.2, amino (═N—H) groups which can be amidated during subsequent amidation step become few, exacerbating water-resistant bond.

The reaction product is then amidated. For amidation, the reaction product may be reacted with a carboxylic acid halide, acid anhydride or acid isopropenyl ester such as acetic chloride, acetic bromide, propionic chloride, acetic anhydride, isopropenyl acetate or benzoyl chloride.

In the coating composition, 0.5 to 20 parts by weight of the compound is preferably blended per 100 parts by weight of component (A). An excessive amount of the compound may result in a coating having a too high crosslinked density, a high hardness, and rather poor adhesion.

In the coating composition, a photo-stabilizer having at least one cyclic hindered amine structure in a molecule may be added for improving weather resistance. The photo-stabilizer used herein should preferably be fully soluble in the solvent of the coating composition, compatible with the organic copolymer (A-2) if used, and low volatile. In the coating composition, 2.6 to 10 parts by weight of the photo-stabilizer is preferably blended per 100 parts by weight of component (A). More than 10 parts of the photo-stabilizer detracts from adhesion of a coating.

Illustrative examples of the photo-stabilizer include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)pyrrolidine-2,5-dione, N-acetyl-3-dodecyl-1-(2,2,6,6-tetramethyl-4-piperidinyl)pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, a condensate of 1,2,3,4-butanetetracarboxylic acid with 2,2,6,6-tetramethylpiperidinol and tridecanol, 8-acetyl-3-dodecyl-7,7,9,9-tetramethyl-1,3,8-triazaspiro[4,5]decane-2,4-dione, a condensate of 1,2,3,4-butanetetracarboxylic acid with 1,2,6,6-tetramethyl-4-piperidinol and β,β,β,β'-tetramethyl-3,9-(2,4,8,10-tetraoxaspiro[5,5]undecane)diethanol, and a condensate of 1,2,3,4-butanetetracarboxylic acid with 2,2,6,6-tetramethyl-4-piperidinol and β,β,β,β'-tetramethyl-3,9-(2,4,8,10-tetraoxaspiro[5,5]undecane)diethanol. For the purpose of fixing the photo-stabilizer, there may be also used silyl-modified photo-stabilizers as disclosed in JP-B 61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, and 2,2,6,6-tetramethylpiperidino-4-propylmethyldiethoxysilane as well as (partial) hydrolyzates thereof. These photo-stabilizers may be used in admixture of two or more.

In the coating composition, a conventional ultraviolet absorber which has not been silyl modified may be added insofar as no detrimental effect is exerted. Such UV absorbers are preferably organic UV absorbers compatible with component (A), especially organic copolymer (A-2). Derivatives of compounds having a hydroxybenzophenone, benzotriazole, cyanoacrylate or triazine main skeleton are especially preferred. Also acceptable are polymers such as vinyl polymers having such a UV absorber incorporated on a side chain. Exemplary UV absorbers are 2,4'-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3-diphenyl acrylate, 2-(2-hydroxy-4-hexyloxyphenyl)-4,6-diphenyltriazine, 4-(2-acryloxyethoxy)-2-hydroxybenzophenone polymer, and 2-(2'-hydroxy-5'-methacryloxyethylphenyl)-2H-benzotriazole polymer. Of these, 2,2',4,4'-tetrahydroxybenzophenone is most preferred from the standpoints of compatibility with the primer coating composition using component (A-2) and volatility. These organic UV absorbers may be used in admixture of two or more.

On use, the coating composition is diluted with a solvent. Useful solvents include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetyl acetone, ethyl acetate, butyl acetate, xylene, and toluene. The primer coating composition is generally diluted with the solvent into a solution containing 5 to 10% by weight of the organic copolymer (A-2) prior to use.

In the coating composition, well-known additives commonly used in conventional coating compositions, such as leveling agents, are blended if necessary.

The coating composition is useful in protecting surfaces of various articles, especially plastic articles. Specifically the coating composition is applied to an article substrate to form a protective coating thereon. The plastic article substrates to which the composition is applicable include those of polycarbonate, polystyrene, modified acrylic resins, urethane resins, thiourethane resins, polycondensates of halogenated bisphenol A and ethylene glycol, acrylic urethane resins, halogenated aryl group-containing acrylic resins, and sulfur-containing resins. The benefits become more outstanding when the coating composition is applied to transparent plastic substrates, and especially polycarbonate resins.

When the coating composition is applied to an article substrate to form a protective coating thereon, it is preferred that a primer layer intervenes between the substrate and the coating in order to enhance the adhesion to the substrate, especially plastic substrate. The primer coating composition used herein to form the primer layer is preferably selected from (i) primer coating compositions comprising components (A-2) and (B); (ii) primer coating compositions comprising component (A-2), free of component (B); and (iii) primer coating compositions comprising well-known organic resins commonly used as the primer, for example, thermosetting acrylic resins, moisture-curable acrylic resins, thermoplastic acrylic resins, silane or siloxane-modified acrylic resins, and urethane resins. Of these, the primer coating compositions (i) comprising components (A-2) and (B) are preferred.

The primer coating composition in solution form is applied to a surface of a plastic substrate, typically a plastic film, which has been cleaned, whereupon the diluting solvent is evaporated off at room temperature or elevated temperature, leaving a dry undercoat of about 1 to 10 μm, preferably about 2 to 5 μm thick. The organic solvent dilution should preferably have a viscosity of about 5 to 30 centistokes. A dilution with a viscosity of less than 5 centistokes would be difficult to form a thick coat whereas a dilution with a viscosity of more than 30 centistokes would be difficult to handle and apply. To the composition, a fluorochemical or silicone surfactant may be added for leveling of the coating, and a catalytic amount of a crosslinking/curing catalyst may also be added for accelerating cure.

By covering plastic substrates such as plastic films and sheets with the cured coat or primer layer of the primer coating composition, the substrates are improved in initial adhesion, heat resistance, hot-water resistance, and weather resistance. Advantageously, a topcoat is formed on the primer coat, using a coating composition.

The coating composition for the topcoat is in the first place, the coating composition of the invention mentioned above, especially the coating composition comprising component (A-1) and (B), and in the second place, a conventional colloidal silica-laden organopolysiloxane composition. The latter composition contains a hydrolyzate or co-hydrolyzate of an organoxysilane having the general formula (2):

wherein $R^7$ is an alkyl group, aryl group, halogenated alkyl group, halogenated aryl group or alkenyl group of 1 to 10 carbon atoms, or an organic group having an epoxy, (meth) acryloxy, mercapto, amino or cyano group, $R^8$ is hydrogen or a monovalent organic group of 1 to 10 carbon atoms (e.g., alkyl and alkenyl), and e is equal to 0, 1 or 2, and 5 to 70% by weight of colloidal silica obtained by dispersing silica fines with a size of 1 to 100 nm in water or alcohol (e.g., methanol, ethanol, isobutanol or diacetone alcohol). The topcoat composition is applied onto the primer coat of the primer coating composition on a plastic substrate and cured by heating, typically at a temperature of 50 to 140° C. In this way, a top coat is formed on the plastic substrate to a high bond strength. The top coat of the inventive coating composition or conventional organo-polysiloxane composition synergistically cooperates with the primer coat of the inventive primer coating composition to accomplish high adhesion and abrasion resistance as well as excellent weather resistance and its stability due to the improved UV absorbing capability.

EXAMPLE

Examples of the invention are given below by way of illustration and not by way of limitation. All parts and percents are by weight. The viscosity is at 25° C. Synthesis Examples are first described.
Synthesis of Component (1)

Synthesis Example 1

A 0.5-liter flask equipped with a stirrer, condenser and thermometer was charged with 170.6 g (0.6 mol) of titanium tetraisopropoxide and 38.4 g (0.1 mol) of zirconium tetra-n-butoxide. With stirring at room temperature, 70 g (0.7 mol) of acetylacetone from a dropping funnel was added dropwise over 30 minutes. During the addition, the internal temperature rose to 63° C. Stirring was continued for one hour at room temperature for ripening, obtaining a hydrolyzable metal compound in yellow clear solution form. The flask was heated to an internal temperature of 70° C., and 44.6 g of a 3% hydrochloric acid aqueous solution (water 2.38 mol) was added dropwise over 20 minutes. This was followed by 10 hours of reaction at 70–80° C., yielding a pale yellowish brown clear solution at pH 2.79. Its solid concentration was 29.2%. The solution was diluted with ethanol to a solid concentration of 0.05 g/l, which was analyzed for absorbance by spectrophotometry, finding absorption of wavelengths below 350 nm.

Synthesis Example 2

A 0.5-liter flask equipped with a stirrer, condenser and thermometer was charged with 170.6 g (0.6 mol) of titanium tetraisopropoxide and 38.4 g (0.1 mol) of zirconium tetra-n-butoxide. With stirring at room temperature, 49.1 g (0.49 mol) of acetylacetone from a dropping funnel was added dropwise over 30 minutes. During the addition, the internal temperature rose to 64° C. Stirring was continued for one hour at room temperature for ripening, obtaining a hydrolyzable metal compound in yellow clear solution form. The flask was heated to an internal temperature of 70° C., and 44.6 g of a 3% hydrochloric acid aqueous solution (water 2.38 mol) was added dropwise over 20 minutes. This was followed by 10 hours of reaction at 70–80° C., yielding a pale yellow clear solution at pH 3.05. Its solid concentration was 30.4%. The solution was diluted with ethanol to a solid concentration of 0.05 g/l, which was analyzed for absorbance by spectrophotometry, finding absorption of wavelengths below 350 nm.

Synthesis Example 3

A 0.5-liter flask equipped with a stirrer, condenser and thermometer was charged with 170.6 g (0.6 mol) of titanium tetraisopropoxide and 38.4 g (0.1 mol) of zirconium tetra-n-butoxide. With stirring at room temperature, 70 g (0.7 mol) of acetylacetone from a dropping funnel was added dropwise over 30 minutes. During the addition, the internal temperature rose to 63° C. Stirring was continued for one hour at room temperature for ripening, obtaining a hydrolyzable metal compound in yellow clear solution form. The flask was heated to an internal temperature of 70° C., and 77.9 g of a 3% hydrochloric acid aqueous solution (water 4.2 mol) was added dropwise over 40 minutes. This was followed by 10 hours of reaction at 70–80° C., yielding a pale yellow clear solution at pH 1.62. Its solid concentration was 22.6%. The solution was diluted with ethanol to a solid concentration of 0.05 g/l, which was analyzed for absorbance by spectrophotometry, finding absorption of wavelengths below 350 nm.

Synthesis Example 4

A 0.5-liter flask equipped with a stirrer, condenser and thermometer was charged with 170.6 g (0.6 mol) of titanium tetraisopropoxide and 38.4 g (0.1 mol) of zirconium tetra-n-butoxide. With stirring at room temperature, 70 g (0.7 mol) of acetylacetone from a dropping funnel was added dropwise over 30 minutes. During the addition, the internal temperature rose to 63° C. Stirring was continued for one hour at room temperature for ripening, obtaining a hydrolyzable metal compound in yellow clear solution form. The flask was heated to an internal temperature of 70° C., and 103.9 g of a 3% hydrochloric acid aqueous solution (water 5.6 mol) was added dropwise over 40 minutes. This was followed by 10 hours of reaction at 70–80° C., yielding a pale yellow, slightly turbid sol solution at pH 1.14 having a mean particle size of 60 nm. Its solid concentration was 21.3%. The solution was diluted with ethanol to a solid concentration of 0.05 g/l, which was analyzed for absorbance by spectrophotometry, finding absorption of wavelengths below 350 nm.

Synthesis Example 5

A 0.5-liter flask equipped with a stirrer, condenser and thermometer was charged with 170.6 g (0.6 mol) of titanium tetraisopropoxide and 38.4 g (0.1 mol) of zirconium tetra-n-butoxide. With stirring at room temperature, 70 g (0.7 mol) of acetylacetone from a dropping funnel was added dropwise over 30 minutes. During the addition, the internal temperature rose to 63° C. Stirring was continued for one hour at room temperature for ripening, obtaining a hydrolyzable metal compound in yellow clear solution form. The flask was heated to an internal temperature of 70° C., and 129.9 g of a 3% hydrochloric acid aqueous solution (water 7.0 mol) was added dropwise over 60 minutes. This was followed by 10 hours of reaction at 70–80° C., yielding a pale yellow, slightly turbid sol solution at pH 1.02 having a mean particle size of 80 nm. Its solid concentration was 20.0%. The solution was diluted with ethanol to a solid concentration of 0.05 g/l, which was analyzed for absorbance by spectrophotometry, finding absorption of wavelengths below 350 nm.

Synthesis Example 6

A 0.5-liter flask equipped with a stirrer, condenser and thermometer was charged with 170.6 g (0.6 mol) of titanium tetraisopropoxide, 38.4 g (0.1 mol) of zirconium tetra-n-butoxide and triethoxyiron (III). With stirring at room temperature, 70 g (0.7 mol) of acetylacetone from a dropping funnel was added dropwise over 30 minutes. During the addition, the internal temperature rose to 62° C. Stirring was continued for one hour at room temperature for ripening, obtaining a hydrolyzable metal compound in yellow clear solution form. The flask was heated to an internal temperature of 70° C., and 44.6 g of a 3% hydrochloric acid aqueous solution (water 2.38 mol) was added dropwise over 20 minutes. This was followed by 10 hours of reaction at 70–80° C., yielding a reddish brown clear solution at pH 2.81. Its solid concentration was 30.1%. The solution was diluted with ethanol to a solid concentration of 0.05 g/l, which was analyzed for absorbance by spectrophotometry, finding absorption of wavelengths below 350 nm.

Synthesis Example 7

A 0.5-liter flask equipped with a stirrer, condenser and thermometer was charged with 170.6 g (0.6 mol) of titanium tetraisopropoxide and 37.4 g (0.18 mol) of tetraethoxysilane. With stirring at room temperature, 70 g (0.7 mol) of acetylacetone from a dropping funnel was added dropwise over 30 minutes. During the addition, the internal temperature rose to 59° C. Stirring was continued for one hour at room temperature for ripening, obtaining a hydrolyzable metal compound in yellow clear solution form. The flask was heated to an internal temperature of 70° C., and 49.2 g of a 3% hydrochloric acid aqueous solution (water 2.65 mol) was added dropwise over 20 minutes. This was followed by 10 hours of reaction at 70–80° C., yielding a pale yellowish brown clear solution at pH 2.06. Its solid concentration was 32.8%. The solution was diluted with ethanol to a solid concentration of 0.05 g/l, which was analyzed for absorbance by spectrophotometry, finding absorption of wavelengths below 350 nm.

Synthesis Example 8

A 0.5-liter flask equipped with a stirrer, condenser and thermometer was charged with 170.6 g (0.6 mol) of titanium tetraisopropoxide and 38.4 g (0.1 mol) of zirconium tetra-n-butoxide. With stirring at room temperature, 70 g (0.7 mol) of acetylacetone from a dropping funnel was added dropwise over 30 minutes. During the addition, the internal temperature rose to 63° C. Stirring was continued for one hour at room temperature for ripening, obtaining a hydrolyzable metal compound in yellow clear solution form. The flask was heated to an internal temperature of 70° C., and 44.6 g of a 3% acetic acid aqueous solution (water 2.38 mol) was added dropwise over 20 minutes. This was followed by 10 hours of reaction at 70–80° C., yielding a pale yellowish brown clear solution at pH 6.89. Its solid concentration was 32.5%. The solution was diluted with ethanol to a solid concentration of 0.05 g/l, which was analyzed for absorbance by spectrophotometry, finding absorption of wavelengths below 350 nm.

Synthesis Example 9

A 0.5-liter flask equipped with a stirrer, condenser and thermometer was charged with 170.6 g (0.6 mol) of titanium tetraisopropoxide and 38.4 g (0.1 mol) of zirconium tetra-n-butoxide. With stirring at room temperature, 140 g (1.4 mol) of acetylacetone from a dropping funnel was added dropwise over 45 minutes. During the addition, the internal temperature rose to 68° C. Stirring was continued for one hour at room temperature for ripening, obtaining a hydrolyzable metal compound in yellow clear solution form. The flask was heated to an internal temperature of 70° C., and 46.0 g of 6.9% aqueous ammonia (water 2.38 mol) was added dropwise over 20 minutes. This was followed by 10 hours of reaction at 70–80° C., yielding a pale yellowish brown clear solution at pH 6.76. Its solid concentration was 27.5%. The solution was diluted with ethanol to a solid concentration of 0.05 g/l, which was analyzed for absorbance by spectrophotometry, finding absorption of wavelengths below 350 nm.

Synthesis Example 10

A 0.5-liter flask equipped with a stirrer, condenser and thermometer was charged with 170.6 g (0.6 mol) of titanium tetraisopropoxide and 38.4 g (0.1 mol) of zirconium tetra-n-butoxide. With stirring at room temperature, 140 g (1.4 mol) of acetylacetone from a dropping funnel was added dropwise over 45 minutes. During the addition, the internal temperature rose to 72° C. Stirring was continued for one hour at room temperature for ripening, obtaining a hydrolyzable metal compound in yellow clear solution form. With stirring at room temperature, 46.0 g of 6.9% aqueous ammonia (water 2.38 mol) was added dropwise over 20 minutes. This was followed by 20 hours of reaction at room temperature, whereupon a yellowish white precipitate settled. This was filtered, washed with acetone, and dried in vacuum at 60° C. for 3 hours, obtaining 121 g of a yellowish white powder. This was diluted with ethanol to a solid concentration of 0.05 g/l, which was analyzed for absorbance by spectrophotometry, finding absorption of wavelengths below 350 nm. Elemental analysis of the powder gave the results of C: 44.9% and H: 5.3%, indicating a substantially theoretical content of acetylacetonate groups.

Synthesis Example 11

A 0.5-liter flask equipped with a stirrer, condenser and thermometer was charged with 170.6 g (0.6 mol) of titanium tetraisopropoxide and 38.4 g (0.1 mol) of zirconium tetra-n-butoxide. With stirring at room temperature, 60 g (0.6 mol) of acetylacetone and 18.4 g (0.1 mol) of 2,2,6,6- tetramethyl-3,5-heptanedione from a dropping funnel was added dropwise over 35 minutes. During the addition, the internal temperature rose to 62° C. Stirring was continued for one hour at room temperature for ripening, obtaining a hydrolyzable metal compound in yellow clear solution form. The flask was heated to an internal temperature of 70° C., and 44.6 g of a 3% hydrochloric acid aqueous solution (water 2.38 mol) was added dropwise over 20 minutes. This was followed by 10 hours of reaction at 70–80° C., yielding a pale yellowish brown clear solution at pH 2.80. Its solid concentration was 30.5%. The solution was diluted with ethanol to a solid concentration of 0.05 g/l, which was analyzed for absorbance by spectrophotometry, finding absorption of wavelengths below 350 nm.

Synthesis Example 12

A 0.5-liter flask equipped with a stirrer, condenser and thermometer was charged with 199.0 g (0.7 mol) of titanium tetraisopropoxide. With stirring at room temperature, 70 g (0.7 mol) of acetylacetone from a dropping funnel was added dropwise over 30 minutes. During the addition, the internal temperature rose to 68° C. Stirring was continued for one hour at room temperature for ripening, obtaining a hydrolyzable metal compound in yellow clear solution form. The flask was heated to an internal temperature of 70° C., and 19.5 g of a 3% hydrochloric acid aqueous solution (water 1.05 mol) was added dropwise over 20 minutes. This was followed by 10 hours of reaction at 70–80° C., yielding a brown clear solution at pH 2.70. Its solid concentration was 28.9%. The solution was diluted with ethanol to a solid concentration of 0.05 g/l, which was analyzed for absorbance by spectrophotometry, finding absorption of wavelengths merely below 300 nm.

Synthesis of Component (2)

Synthesis Example 13

A 0.5-liter flask equipped with a stirrer, condenser and thermometer was charged with 140 g (1.4 mol) of acetylacetone and 46.0 g of a 6.9% hydrochloric acid aqueous solution (water 2.38 mol), which was heated at 70° C. with stirring. A mixture of 170.6 g (0.6 mol) of titanium tetraisopropoxide and 38.4 g (0.1 mol) of zirconium tetra-n-butoxide from a dropping funnel was added dropwise over 60 minutes. During the addition, the internal temperature rose to 80° C. Stirring was continued for 10 hours for ripening, obtaining a yellowish brown clear solution at pH 1.35. Its solid concentration was 35.8%. This was diluted with ethanol to a solid concentration of 0.05 g/l, which was analyzed for absorbance by spectrophotometry, finding absorption of wavelengths below 350 nm.

Synthesis Example 14

A 0.5-liter flask equipped with a stirrer, condenser and thermometer was charged with 140 g (1.4 mol) of acetylacetone and 46.0 g of 6.9% aqueous ammonia (water 2.38 mol), which was heated at 70° C. with stirring. A mixture of 170.6 g (0.6 mol) of titanium tetraisopropoxide and 38.4 g (0.1 mol) of zirconium tetra-n-butoxide from a dropping funnel was added dropwise over 60 minutes. During the addition, the internal temperature rose to 82° C. Stirring was continued for 10 hours for ripening, obtaining a yellowish brown, slightly turbid solution at pH 7.00. Its solid concentration was 27.8%. This was diluted with ethanol to a solid concentration of 0.05 g/l, which was analyzed for absorbance by spectrophotometry, finding absorption of wavelengths below 350 nm.

Synthesis Example 15

A 0.5-liter flask equipped with a stirrer, condenser and thermometer was charged with 70 g (0.7 mol) of acetylacetone and 46.0 g of a 6.9% hydrochloric acid aqueous solution (water 2.38 mol), which was heated at 70° C. with stirring. A mixture of 170.6 g (0.6 mol) of titanium tetraisopropoxide and 38.4 g (0.1 mol) of zirconium tetra-n-butoxide from a dropping funnel was added dropwise over 60 minutes. During the addition, the internal temperature rose to 79° C. Stirring was continued for 10 hours for ripening, obtaining a yellowish brown clear solution at pH 1.03. Its solid concentration was 31.2%. This was diluted with ethanol to a solid concentration of 0.05 g/l, which was analyzed for absorbance by spectrophotometry, finding absorption of wavelengths below 350 nm.

Synthesis Example 16

A 0.5-liter flask equipped with a stirrer, condenser and thermometer was charged with 140 g (1.4 mol) of acetylacetone and 56.8 g of a 6.9% hydrochloric acid aqueous solution (water 2.94 mol), which was heated at 70° C. with stirring. A mixture of 170.6 g (0.6 mol) of titanium tetraisopropoxide and 38.4 g (0.1 mol) of zirconium tetra-n-butoxide from a dropping funnel was added dropwise over 60 minutes. During the addition, the internal temperature rose to 85° C. Stirring was continued for 10 hours for ripening, obtaining a yellowish brown clear solution at pH 1.00. Its solid concentration was 24.9%. This was diluted with ethanol to a solid concentration of 0.05 g/l, which was analyzed for absorbance by spectrophotometry, finding absorption of wavelengths below 350 nm.

Synthesis Example 17

A 1.0-liter flask equipped with a stirrer, condenser and thermometer was charged with 70 g (0.7 mol) of acetylacetone and 259.8 g of a 3% hydrochloric acid aqueous solution (water 14 mol), which was heated at 70° C. with stirring. 199.0 g (0.7 mol) of titanium tetraisopropoxide from a dropping funnel was added dropwise over 60 minutes. During the addition, the internal temperature rose to 80° C. Stirring was continued for ripening, but the solution gelled after 30 minutes.

Synthesis of alkoxysilyl group-bearing organic copolymer

Synthesis Example 18

A 0.5-liter flask equipped with a stirrer, condenser and thermometer was charged with 20 g of γ-methacryloxypropyltrimethoxysilane, 60 g of methyl methacrylate, 5 g of ethyl acrylate, 5 g of vinyl acetate, 10 g of glycidyl methacrylate, 0.2 g of ethylene glycol dimethacrylate, 0.5 g of azobisisobutyronitrile as a polymerization initiator, and 20 g of diacetone alcohol and 80 g of ethylene glycol monomethyl ether as solvent. In a nitrogen stream, the contents were stirred for 5 hours at 80–90° C. The resulting solution of alkoxysilyl group-bearing organic copolymer had a viscosity of 43,600 centistokes. The copolymer had an alkoxyl group content of 20%.

Synthesis Example 19

Synthesis was carried out as in Synthesis Example 18 except that the amount of γ-methacryloxypropyltrimethoxysilane was changed from 20 g to 10 g, and the amount of methyl methacrylate was changed from 60 g to 70 g. The resulting solution of alkoxysilyl group-bearing organic copolymer had a viscosity of 40,600 centistokes. The copolymer had an alkoxyl group content of 10%.

Synthesis Example 20

Synthesis was carried out as in Synthesis Example 18 except that 20 g of vinyltrimethoxisilane was used instead of 20 g of γ-methacryloxypropyltrimethoxysilane. The resulting solution of alkoxysilyl group-bearing organic copolymer had a viscosity of 39,700 centistokes. The copolymer had an alkoxyl group content of 20%.

Synthesis of Compound Containing Nitrogen and Alkoxysilyl Group in Molecule

Synthesis Example 21

A 2.0-liter flask equipped with a stirrer, condenser and thermometer was charged with 222 g of N-2-(aminoethyl)-3-aminopropyltrimethoxysilane and 242 g of hexamethyldisilazane as a silylating agent. In a nitrogen stream, the flask was heated at 120° C., to which 496 g of γ-glycidoxypropylmethyldiethoxysilane was added dropwise. The reaction mixture was heated and stirred at 120° C. for 5 hours. Upon removal of a low-boiling fraction under vacuum at 100° C., there was left 862 g of a viscous compound having a viscosity of 1,387 centistokes, a refractive index of 1.4618 and a specific gravity of 1.048.

A 2.0-liter flask equipped with a stirrer, condenser and thermometer was charged with 862 g of the reaction product and 862 g of toluene. In a nitrogen stream, 141 g of acetic anhydride was added dropwise to the solution at room temperature. The reaction mixture was heated and stirred at 110° C. for 2 hours. Then 141 g of methanol was added thereto at 50° C., followed by heating and stirring at 50° C. for one hour. Upon removal of a low-boiling fraction under vacuum at 100° C., there was left a highly viscous compound. It was analyzed by infrared spectroscopy, finding no absorption peaks attributable to OH or NH group in the region of at least 3,000 $cm^{-1}$, but a sharp absorption peak attributable to amide group at 1,650 $cm^{-1}$.

Synthesis of Colloidal Silica-laden Organopolysiloxane Composition

Synthesis Example 22

A 1.0-liter flask equipped with a stirrer, condenser and thermometer was charged with 164 g of methyltriethoxysilane and 46 g of isobutanol, which were maintained below 5° C. under ice cooling with stirring. To this was added 138 g of colloidal silica (containing 20% of $SiO_2$) below 5° C. The mixture was stirred for 2 hours under ice cooling and for a further 8 hours at 20 to 25° C. Thereafter, 45 g of diacetone alcohol and 50 g of isobutanol were added, 1.5 g of a 10% aqueous solution of sodium propionate was then added, and the resulting mixture was adjusted to pH 6 to 7 with acetic acid. This was adjusted with isobutanol to a nonvolatile content of 17% as measured by JIS K-6833 and ripened for 5 days at room temperature. The resulting colloidal silica-laden organopolysiloxane composition had a viscosity of about 5 centistokes and the nonvolatile component had a number average molecular weight of about 1,000.

Synthesis Example 23

The procedure of Synthesis Example 22 was repeated except that 3.0 g of a 10% aqueous solution of tetramethylammonium benzoate was used instead of the sodium propionate aqueous solution, obtaining a colloidal silica-laden organopolysiloxane composition.

Synthesis Example 24

The procedure of Synthesis Example 22 was repeated except that there was further added 1.8 g of 2,2',4,4'-tetrahydroxybenzophenone (corresponding to 2 parts per 100 parts of the solids of the colloidal silica-laden organopolysiloxane composition), obtaining a colloidal silica-laden organopolysiloxane composition.

Synthesis of Silyl-modified Photo-stabilizer

Synthesis Example 25

A 0.3-liter flask equipped with a stirrer, condenser and thermometer was charged with 100 g (0.5 mol) of 2,2,6,6-tetramethyl-4-allyl-piperidine and 0.13 g of a butanol solution of chloroplatinic acid (2% solution of $H_2PtCl_6 \cdot 6H_2O$). To the flask at room temperature, 80.6 g (0.66 mol) of trimethoxysilane was added dropwise over one hour, and reaction effected at 90° C. for 5 hours. At the end of reaction, distillation was effected under vacuum, collecting 126 g of a fraction at 151–154° C. at 7 mmHg. By gas chromatography, 2,2,6,6-tetramethylpiperidino-4-propyltrimethoxysilane was collected at a purity of 97%. Its structure was confirmed by IR spectrometry and proton-NMR analysis.

Now, Examples of the invention are given together with Comparative Examples. The abbreviations for UV absorbers, microparticulate inorganic oxides, hindered amine photo-stabilizers, and organic copolymers used herein have the following meaning.

Component (1)

The solid concentration was adjusted to 20% using methanol, prior to use.

Ti-1: the reaction product of Synthesis Example 1
Ti-2: the reaction product of Synthesis Example 2
Ti-3: the reaction product of Synthesis Example 3
Ti-4: the reaction product of Synthesis Example 4
Ti-5: the reaction product of Synthesis Example 5
Ti-6: the reaction product of Synthesis Example 6
Ti-7: the reaction product of Synthesis Example 7
Ti-8: the reaction product of Synthesis Example 8
Ti-9: the reaction product of Synthesis Example 9
Ti-10: the reaction product of Synthesis Example 10
Ti-11: the reaction product of Synthesis Example 10
Ti-12: the reaction product of Synthesis Example 12

Component (2)

The solid concentration was adjusted to 20% using methanol, prior to use.

Ti-13: the reaction product of Synthesis Example 13
Ti-14: the reaction product of Synthesis Example 14
Ti-15: the reaction product of Synthesis Example 15
Ti-16: the reaction product of Synthesis Example 16

Organic UV absorbers

UVA-1: 2,2',4,4'-tetrahydroxybenzophenone
UVA-2: 2,4-dihydroxybenzophenone
UVA-3: 2-(3,5-di-t-butyl-2-hydroxyphenyl)-5-chlorobenzotriazole
UVA-4: 2-(2-hydroxy-4-hexyloxyphenyl)-4,6-diphenyltriazine
UVA-5: a copolymer of 2-(2'-hydroxy-5'-methacryloxyethylphenyl)-2H-benzotriazole (30%) and methyl methacrylate (70%)
UVA-6: a copolymer of 2-(2'-hydroxy-5'-methacryloxyethylphenyl)-2H-benzotriazole (30%) and styrene (70%)

Microparticulate Inorganic Oxides

UV-1: cerium oxide sol (20% methanol dispersion of $CeO_2$ with a mean particle size of 20 mμ)

UV-2: surface treated zinc oxide sol (20% methanol dispersion of zinc oxide particles surface coated with 15% of silica and having a mean particle size of 20 mμ)

UV-3: silica sol (20% methanol dispersion of $SiO_2$ with a mean particle size of 20 mμ)

UV-4: titania sol (20% methanol dispersion of $TiO_2$ with a mean particle size of 20 mμ)

UV-5: surface treated titanium oxide sol (20% methanol dispersion of titania particles containing 85% $TiO_2$, surface coated with $SiO_2$ and having a mean particle size of 20 mμ)

UV-6: microparticulate compound oxide sol (20% methanol dispersion of mixed compound titanium oxide having an average composition: $TiO_2/ZrO_2/SiO_2$=70/8/22 and having a mean particle size of 20 mμ)

Hindered Amine Photo-stabilizers

HALS-1: N-acetyl-3-dodecyl-1-(2,2,6,6-tetramethyl-4-piperidinyl)pyrrolidine-2,5-dione HALS-2: a condensate of 1,2,3,4-butanetetracarboxylic acid, 2,2,6,6-tetramethyl-piperidinol and tridecanol HALS-3: 2,2,6,6-tetramethylpiperidino-4-propyltrimethoxysilane synthesized in Synthesis Example 25

Alkoxysilyl Group-containing Organic Copolymers

Pol-1: the reaction product of Synthetic Example 18

Pol-2: the reaction product of Synthetic Example 19

Pol-3: the reaction product of Synthetic Example 20

Compounds Containing Nitrogen and Alkoxysilyl Group in Molecule

NSi-1: ureidopropyltriethoxysilane

NSi-2: the reaction product of Synthetic Example 21

Colloidal Silica-laden Organopolysiloxane Compositions

HC-1: colloidal silica-laden organopolysiloxane composition of Synthetic Example 22

HC-2: colloidal silica-laden organopolysiloxane composition of Synthetic Example 23

HC-3: colloidal silica-laden organopolysiloxane composition of Synthetic Example 24

Organometallic Compounds

TPT: tetra-i-propoxytitanium

TBT: tetra-n-butoxytitanium

TBT-P: 5.4 unit oligomer of tetra-n-butoxytitanium

In Examples, physical properties were measured and rated by the following procedures.

(1) Weathering Test

An accelerated weathering test was carried out by a carbon arc sunshine weatherometer according to JIS K-5400. After 5,000 hours, a yellowing factor, adhesion and film transparency were examined. Those samples having a yellowing factor of up to 7 and good adhesion were rated "Passed." Under an optical microscope, micro-cracks on the coating surface were observed.

(2) Marring Test

Using a Taber abrader equipped with an abrasive wheel CS-10F, a sample was rotated under a load of 500 g according to ASTM 1044. After 1,000 revolutions, the sample was measured for haze. A Taber abrasion (%) was calculated as the haze after test minus the haze prior to test.

(3) Adhesion of Cured Film

An adhesive tape test was carried out according to JIS K-5400 by scribing a sample with a razor along eleven spaced 1-mm apart orthogonal lines to define 100 square sections in the coating, closely applying a commercially available adhesive tape thereto, and quickly peeling the adhesive tape by an angle of 90 degrees. The number (X) of remaining (not peeled) coating sections is expressed as X/100.

(4) Age Stability of Coating Solution

The coating solution prepared was allowed to stand at room temperature for 3 months. The state of the aged solution was observed.

○: good

Δ: slightly turbid, precipitate

X: thickened, gelled

EXAMPLE AND COMPARATIVE EXAMPLE (1) Preparation of Primer Coating Composition

Primer coating compositions (a) to (z) were prepared according to the formulation shown in Tables 1 to 3 by mixing components (1) and (2) prepared in Synthesis Examples 1 to 16, polymethyl methacrylate having an average molecular weight of 150,000, the compound containing nitrogen and alkoxysilyl group in molecule (NSi-1, 2), the UV absorber (UVA-1 to 6), and the photo-stabilizer (HALS-1 to 3), and diluting the mixture with a 20/80 mixture of diacetone alcohol and ethylene glycol monomethyl ether to a concentration of 10% organic copolymer solids.

(2) Preparation of Coating Composition

Coating compositions (A) to (Z) were prepared according to the formulation shown in Tables 4 to 6 by mixing components (1) and (2) prepared in Synthesis Examples 1 to 16, the colloidal silica-laden organopolysiloxane composition (HC-1 to 3) prepared in Synthesis Examples 22 to 24, the UV absorber (UVA-1 to 6), and the microparticulate inorganic oxide (UV-1 to 6).

(3) Preparation of Surface-coated Part

The primer coating composition, if used, was applied onto a cleaned surface of a polycarbonate resin sheet of 0.5 mm thick by the flow coating method and cured at about 120° C. for about 30 minutes, obtaining a cured primer coating of 2 to 5 μm thick. The colloidal silica-laden organopolysiloxane coating composition obtained in above (2) was applied onto the primer coating by the flow coating method and cured at about 120° C. for about one hour, obtaining a cured coating of 2 to 5 μm thick. In the event of omitting the primer, the colloidal silica-laden organopolysiloxane coating composition was applied onto a cleaned surface of a polycarbonate resin sheet of 0.5 mm thick by the flow coating method and cured at about 120° C.for about one hour, obtaining a cured coating of 2 to 5 μm thick. The thus surface-coated sheets were examined for physical properties, with the results shown in Table 7.

TABLE 1

| Primer designation | Primer coating composition | | | | | | | | |
|---|---|---|---|---|---|---|---|---|---|
| | a | b | c | d | e | f | g | h | i |
| Component (1) or (2) | Ti-1 (25 parts) | Ti-1 (50 parts) | Ti-2 (25 parts) | Ti-3 (25 parts) | Ti-4 (25 parts) | Ti-5 (25 parts) | Ti-6 (25 parts) | Ti-7 (25 parts) | Ti-8 (25 parts) |
| UVA | UVA-1 (10 parts) | UVA-1 (5 parts) | UVA-1 (10 parts) | UVA-1 (10 parts) | UVA-1 (10 parts) | UVA-1 (10 parts) | UVA-1 (10 parts) | UVA-1 (10 parts) | UVA-1 (10 parts) |
| Organic copolymer | Pol-1 (100 parts) | Pol-1 (100 parts) | Pol-1 (100 parts) | Pol-2 (100 parts) | Pol-3 (100 parts) | Pol-1 (100 parts) | Pol-1 (100 parts) | Pol-1 (100 parts) | Pol-1 (100 parts) |
| Polymethyl methacrylate | — | — | — | — | — | — | 20 parts | 20 parts | 20 parts |
| NSi | — | — | — | — | — | — | — | NSi-1 (5 parts) | NSi-2 (20 parts) |
| HALS | — | — | — | — | — | — | — | — | HALS-1 (10 parts) |

TABLE 2

| Primer designation | Primer coating composition | | | | | | | |
|---|---|---|---|---|---|---|---|---|
| | j | k | l | m | n | o | p | q |
| Component (1) or (2) | Ti-9 (25 parts) | Ti-10 (25 parts) | Ti-10 (25 parts) | Ti-10 (50 parts) | Ti-11 (25 parts) | Ti-13 (25 parts) | Ti-14 (25 parts) | Ti-15 (25 parts) |
| UVA | UVA-1 (10 parts) | UVA-1 (10 parts) | UVA-1 (10 parts) | UVA-1 (7 parts) + UVA-5 (3 parts) | UVA-1 (7 parts) + UVA-6 (3 parts) | UVA-3 (7 parts) + UVA-5 (3 parts) | UVA-1 (7 parts) + UVA-2 (3 parts) | UVA-4 (7 parts) + UVA-5 (3 parts) |
| Organic copolymer | Pol-1 (100 parts) | Pol-1 (100 parts) | Pol-2 (100 parts) | Pol-1 (100 parts) | Pol-1 (100 parts) | Pol-1 (100 parts) | Pol-1 (100 parts) | Pol-1 (100 parts) |
| Polymethyl methacrylate | 20 parts | 20 parts | 20 parts | — | — | — | 20 parts | — |
| NSi | NSi-1 (5 parts) | NSi-2 (20 parts) | NSi-2 (30 parts) | NSi-2 (20 parts) | NSi-2 (20 parts) | NSi-2 (20 parts) | NSi-2 (20 parts) | NSi-2 (20 parts) |
| HALS | HALS-2 (10 parts) | HALS-3 (10 parts) | HALS-3 (6 parts) | HALS-1 (3 parts) | HALS-3 (10 parts) | HALS-3 (6 parts) | HALS-1 (2 parts) | HALS-1 (2 parts) |

TABLE 3

| Primer designation | Primer coating composition | | | | | | | | |
|---|---|---|---|---|---|---|---|---|---|
| | r | s | t | u | v | w | x | y | z |
| Component (1) or (2) | — | — | — | Ti-12 (25 parts) | Ti-12 (25 parts) | Ti-12 (50 parts) | — | — | — |
| UVA | UVA-1 (10 parts) | UVA-1 (20 parts) | UVA-1 (10 parts) | UVA-1 (10 parts) | UVA-4 (10 parts) | UVA-5 (10 parts) | UVA-6 (20 parts) | UVA-6 (20 parts) | UVA-2 (20 parts) |
| Organic copolymer | Pol-1 (100 parts) | Pol-1 (100 parts) | Pol-1 (100 parts) | Pol-1 (100 parts) | Pol-3 (100 parts) | Pol-1 (100 parts) | Pol-1 (100 parts) | Pol-2 (100 parts) | Pol-1 (100 parts) |
| Polymethyl methacrylate | — | — | — | — | — | — | — | — | 20 parts |
| NSi | — | — | — | — | — | — | — | — | NSi-2 (20 parts) |
| HALS | — | — | HALS-2 (3 parts) | — | — | HALS-3 (3 parts) | — | — | HALS-2 (1 parts) |
| Organo-metallic compound | — | — | — | — | — | — | TPT (3 parts) | TBT (3 parts) | TBT-P (3 parts) |

TABLE 4

| Coating composition designation | Coating composition | | | | | | | | |
|---|---|---|---|---|---|---|---|---|---|
| | A | B | C | D | E | F | G | H | I |
| Component (1) or (2) | Ti-1 (10 parts) | Ti-1 (10 parts) | Ti-1 (30 parts) | Ti-2 (10 parts) | Ti-3 (10 parts) | Ti-4 (10 parts) | Ti-5 (10 parts) | Ti-6 (10 parts) | Ti-7 (10 parts) |
| Colloidal silica-laden | HC-1 (100 parts) | HC-3 (100 parts) | HC-1 (100 parts) | HC-1 (100 parts) | HC-2 (100 parts) | HC-1 (100 parts) | HC-1 (100 parts) | HC-1 (100 parts) | HC-1 (100 parts) |

TABLE 4-continued

| Coating composition designation | A | B | C | D | E | F | G | H | I |
|---|---|---|---|---|---|---|---|---|---|
| organopoly-siloxane (as solids) | | | | | | | | | |
| UVA | — | — | — | — | — | UVA-1 (5 parts) | UVA-1 (5 parts) | UVA-1 (5 parts) | UVA-1 (5 parts) |
| UV | — | — | — | — | — | — | — | — | UV-1 (5 parts) |
| HALS | — | — | — | — | — | — | — | — | — |
| Organo-metallic compound | — | — | — | — | — | — | — | — | — |

TABLE 5

| Coating composition designation | J | K | L | M | N | O | P | Q |
|---|---|---|---|---|---|---|---|---|
| Component (1) or (2) | Ti-8 (10 parts) | Ti-9 (10 parts) | Ti-10 (10 parts) | Ti-10 (30 parts) | Ti-11 (10 parts) | Ti-13 (10 parts) | Ti-14 (10 parts) | Ti-15 (10 parts) |
| Colloidal silica-laden organopoly-siloxane (as solids) | HC-1 (100 parts) | HC-1 (100 parts) | HC-1 (100 parts) | HC-1 (100 parts) | HC-1 (100 parts) | HC-1 (100 parts) | HC-1 (100 parts) | HC-1 (100 parts) |
| UVA | UVA-1 (5 parts) | UVA-1 (5 parts) | UVA-1 (10 parts) | UVA-1 (5 parts) | UVA-1 (5 parts) | UVA-2 (5 parts) | UVA-3 (5 parts) | UVA-4 (5 parts) |
| UV | UV-2 (5 parts) | UV-3 (5 parts) | — | — | — | — | — | — |
| HALS | — | — | — | HALS-3 (3 parts) | — | — | — | — |
| Organo-metallic compound | — | — | — | — | — | — | — | — |

TABLE 6

| Coating composition designation | R | S | T | U | V | W | X | Y | Z |
|---|---|---|---|---|---|---|---|---|---|
| Component (1) or (2) | Ti-12 (10 parts) | Ti-12 (30 parts) | — | — | — | — | — | — | — |
| Colloidal silica-laden organopoly-siloxane (as solids) | HC-1 (100 parts) | HC-1 (100 parts) | HC-1 (100 parts) | HC-1 (100 parts) | HC-3 (100 parts) | HC-1 (100 parts) | HC-1 (100 parts) | HC-1 (100 parts) | HC-1 (100 parts) |
| UVA | UVA-1 (10 parts) | UVA-2 (10 parts) | UVA-3 (10 parts) | UVA-4 (10 parts) | UVA-5 (10 parts) | — | UVA-1 (10 parts) | UVA-1 (30 parts) | UVA-1 (10 parts) |
| UV | — | — | UV-4 (20 parts) | UV-4 (40 parts) | UV-5 (20 parts) | — | UV-6 (20 parts) | UV-4 (20 parts) | UV-4 (20 parts) |
| HALS | — | — | — | — | — | — | — | — | HALS-3 (3 parts) |
| Organo-metallic compound | — | — | — | — | TPT (3 parts) | — | TPT (3 parts) | TBT (3 parts) | TBT-P (3 parts) |

TABLE 7

| | Primer | Coating composition | Initial Film transparency | Initial Yellowing factor | Initial Taber abrasion | Weathering Yellowing factor | Weathering crack | Weathering micro-Adhesion | Solution stability |
|---|---|---|---|---|---|---|---|---|---|
| Example | | | | | | | | | |
| 1 | a | A | good | 1.0 | 7 | 1.2 | nil | 100/100 | ○ |
| 2 | b | B | good | 1.2 | 7 | 1.2 | nil | 100/100 | ○ |
| 3 | c | C | good | 1.2 | 7 | 1.2 | nil | 100/100 | ○ |
| 4 | d | D | good | 1.0 | 9 | 1.1 | nil | 100/100 | ○ |
| 5 | e | E | good | 1.0 | 9 | 1.1 | nil | 100/100 | ○ |
| 6 | f | F | good | 1.5 | 8 | 1.6 | nil | 100/100 | ○ |
| 7 | g | G | good | 1.0 | 9 | 1.3 | nil | 100/100 | ○ |
| 8 | h | H | good | 1.0 | 8 | 1.2 | nil | 100/100 | ○ |
| 9 | i | I | good | 1.0 | 7 | 1.2 | nil | 100/100 | ○ |
| 10 | j | J | good | 1.5 | 9 | 1.1 | nil | 100/100 | ○ |
| 11 | k | K | good | 1.5 | 7 | 1.6 | nil | 100/100 | ○ |
| 12 | l | L | good | 1.5 | 8 | 1.6 | nil | 100/100 | ○ |
| 13 | m | M | good | 1.5 | 9 | 1.6 | nil | 100/100 | ○ |
| 14 | n | N | good | 1.2 | 9 | 1.6 | nil | 100/100 | ○ |
| 15 | o | O | good | 1.2 | 9 | 1.5 | nil | 100/100 | ○ |
| 16 | p | P | good | 1.2 | 9 | 1.5 | nil | 100/100 | ○ |
| 17 | q | Q | good | 1.0 | 9 | 1.5 | nil | 100/100 | ○ |
| 18 | — | A | good | 1.0 | 8 | 1.1 | nil | 100/100 | ○ |
| 19 | — | F | good | 1.0 | 8 | 1.1 | nil | 100/100 | ○ |
| 20 | — | G | good | 1.0 | 8 | 1.1 | nil | 100/100 | ○ |
| 21 | — | L | good | 1.2 | 9 | 1.1 | nil | 100/100 | ○ |
| 22 | b | — | good | 1.5 | 8 | 1.5 | nil | 100/100 | ○ |
| 23 | k | — | good | 1.0 | 8 | 1.5 | nil | 100/100 | ○ |
| 24 | a | HC-3 | good | 1.0 | 8 | 1.2 | nil | 100/100 | ○ |
| 25 | f | HC-1 | good | 1.0 | 9 | 1.2 | nil | 100/100 | ○ |
| 26 | k | HC-3 | good | 1.0 | 8 | 1.2 | nil | 100/100 | ○ |
| 27 | m | HC-3 | good | 1.0 | 7 | 1.2 | nil | 100/100 | ○ |
| Comparative Example | | | | | | | | | |
| 1 | r | R | turbid | 3.5 | 10 | 15 | cracks | 0/100 | Δ |
| 2 | s | S | turbid | 7.0 | 15 | 30 | cracks | 0/100 | Δ |
| 3 | t | T | turbid | 3.0 | 15 | 10 | cracks | 0/100 | Δ |
| 4 | u | U | turbid | 9.0 | 20 | 35 | cracks | 50/100 | X |
| 5 | v | V | turbid | 9.0 | 15 | 10 | cracks | 50/100 | X |
| 6 | w | W | good | 8.0 | 15 | 10 | cracks | 50/100 | X |
| 7 | x | X | turbid | 2.0 | 20 | 10 | cracks | 0/100 | Δ |
| 8 | y | Y | turbid | 2.0 | 20 | 10 | cracks | 0/100 | Δ |
| 9 | z | Z | turbid | 2.0 | 15 | 30 | cracks | 50/100 | Δ |
| 10 | — | X | turbid | 9.0 | 20 | 25 | cracks | 0/100 | Δ |
| 11 | s | HC-1 | good | 2.0 | 10 | 20 | cracks | 0/100 | Δ |
| 12 | w | HC-3 | good | 2.0 | 10 | 25 | cracks | 0/100 | Δ |
| 13 | z | HC-1 | good | 2.0 | 10 | 20 | cracks | 50/100 | Δ |

There has been described coating compositions which can endow plastic articles, especially of polycarbonate resins, with superior transparency, mar resistance, weather resistance, and chemical resistance, when the articles are coated therewith. The coated articles find use in outdoor applications as windows and windshields on vehicles such as aircraft and automobiles, building windows, and acoustic barrier walls along highways.

Japanese Patent Application No. 2000-172511 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A coating composition comprising
   (A) 100 parts by weight of an organo silicon compound having a hydrolyzable group-bearing silyl group, and
   (B) 0.1 to 50 parts by weight of a hydrolytic condensate of a reaction rroduct of a β-diketone with a mixture
   (b-1) containing a titanium tetraalkoxide and a metal alkoxide of the formula: $M(OR)_n$ wherein M is at least one metal selected from the group consisting of Zr, Fe, Al, Zn, In, Cu, Si, Sn, W, and Mg, n is the valence of said metal, and R is an alkyl group of 1 to 10 carbon atoms or hydrogen.

2. The coating composition of claim 1 wherein component (A) is a silane compound of the formula (1):

$$R^3{}_a Si(R^4)_{4-a} \tag{1}$$

wherein $R^3$ is an alkyl, aryl, halogenated alkyl, halogenated aryl or alkenyl group of 1 to 10 carbon atoms or an organic group having an epoxy, (meth)acryloxy, mercapto, amino or cyano group, $R^4$ is an alkoxy, alkenyloxy, acyloxy or alkoxyalkoxy group of 1 to 10 carbon atoms, and "a" is 0, 1 or 2, and/or a hydrolyzate thereof.

3. The coating composition of claim 1 wherein component (A) is an organic copolymer of an alkoxysilyl group-containing acrylic and/or vinyl monomer and another monomer copolymerizable therewith, the content of the alkoxysilyl group-containing acrylic and/or vinyl monomer in said organic copolymer being 0.1 to 50% by weight.

4. A method for providing a plastic substrate with a weather and abrasion-resistant coating, comprising the steps of:
(i) applying an organic solvent solution of the coating composition of claim 3 onto a plastic substrate,
(ii) evaporating the organic solvent and curing the coating to form a primer layer,
(iii) applying a coating composition, comprising (A) 100 parts by weight of a silane compound of the formula $R^3{}_aSi(R^4)_{4-a}$ wherein $R^3$ is an alkyl, aryl, halogenated alkyl, halgenated aryl, or alkenyl group of 1 to 10 carbon atoms or an organic group having an epoxy, (meth)acryloxy, mercapto, amino, or cyano group, $R^4$ is an alkoxy, alkenyloxy, acyloxy, or alkoxyalkoxy group of 1 to 10 carbon atoms, and "a" is 0, 1, or 2 and/or a hydrolyzate therof, and (B) 0.1 to 50 parts by weight of a hydrolytic condensate of a reaction product and/or a mixture of a β-diketone with a mixture (b-1) containing a titanium tetraalkoxide and a metal alkoxide of the formula $M(OR)_n$ wherein M is at least one metal selected from the group consisting of Zr, Fe, Al, Zn, In, Cu, Si, Sn, W, and Mg, n is the valence of said metal, and R is an alkyl group of 1 to 10 carbon atoms or hydrogen, onto the primer layer, and
(iv) heating the coating of the coating composition at a temperature of 50 to 140° C. for curing.

5. The method of claim 4 wherein the plastic substrate is comprised of a polycarbonate resin.

6. An article obtained by the method of claim 4.

7. A method for providing a plastic substrate with a weather and abrasion-resistant coating, comprising the steps of:
(i) applying an organic solvent solution of the coating composition of claim 3 onto a plastic substrate,
(ii) evaporating the organic solvent and curing the coating to form a primer layer,
(iii) applying a colloidal silica-laden organopolysiloxane composition onto the primer layer, said organopolysiloxane composition comprising a hydrolyzate or co-hydrolyzate of an alkoxysilane of the following general formula (2):

$$R^7{}_eSi(OR^8)_{4-e} \quad (2)$$

wherein $R^7$ is selected from the class consisting of an alkyl group, aryl group, halogenated alkyl group, halogenated aryl group and alkenyl group of 1 to 10 carbon atoms, and an organic group having an epoxy, (meth)acryloxy, mercapto, amino or cyano group, $R^8$ is hydrogen or a monovalent organic group of 1 to 10 carbon atoms, and x is equal to 0, 1 or 2, and colloidal silica, and
(iv) heating the coating of the organopolysiloxane composition at a temperature of 50 to 140° C. for curing.

8. A primer comprising the coating composition of claim 3.

9. The coating composition of claim 1 wherein component (B) is a hydrolytic condensate obtained by reacting in a solvent the mixture (b-1) with a β-diketone of the general formula: $R^1COCH_2COR^2$ wherein $R^1$ and $R^2$ are alkyl groups of 1 to 6 carbon atoms and may be the same or different, followed by hydrolytic condensation.

10. The coating composition of claim 1 wherein component (B) is a hydrolytic condensate obtained by subjecting the mixture (b=1) to hydrolytic condensation in a solvent containing a β-diketone of the general formula: $R^1COCH_2COR^2$ wherein R1 and R2 are alkyl groups of 1 to 6 carbon atoms and may be the same or different.

11. The coating composition of claim 1 wherein the amount of the β-diketone is 0.5 to 2 molar equivalents based on the mixture (b-1).

12. The coating composition of claim 1 wherein the amount of water used in hydrolytic condensation is 3.1 to 15 molar equivalents based on the mixture (b-1).

13. The coating composition of claim 1 wherein the mixture (b-1) contains 100 parts by weight calculated as $TiO_2$ of the titanium tetraalkoxide and 0.01 to 50 parts by weight calculated as oxide of the metal alkoxide.

14. The coating composition of claim 1 wherein component (B) is microparticulate metal oxide having a mean particle size of up to 100 nm and bearing β-diketone groups.

15. The coating composition of claim 1 wherein component (B) is capable of absorbing ultraviolet radiation having a wavelength of up to 350 nm.

16. An article having a coating with improved weather resistance and abrasion resistance, the coating being formed from the coating composition of claim 1.

17. The coating composition of claim 1, wherein component (A) is methyltriethoxysilane and component (B) is a hydrolytic condensate obtained by reacting titanium isopropoxide and zirconium tetra-n-butoxide with acetylacetone.

18. A coating composition comprising
(A) 100 parts by weight of an organo silicon compound having a hydrolysable group-bearing silyl group,
(B) 0.1 to 50 parts by weight of a hydrolytic condensate of a reaction product and/or a mixture of a β-diketone with a mixture (b-1) containing a titanium tetraalkoxide and a metal alkoxide of the formula: M(OR)n wherein M is at least one metal selected from the group consisting of Zr, Fe, Al, Zn, In, Cu, Si, Sn, W, and Mg, n is the valence of said metal, and R is an alkyl group of 1 to 10 carbon atoms or hydrogen, and
(C) 0.1 to 100 parts by weight of a microparticulate inorganic oxide containing at least one atom selected from cerium and zinc and capable of absorbing radiation having a wavelength of up to 400 nm.

19. A coating composition comprising
(A) 100 parts by weight of an organosilicon compound having a hydrolysable group-bearing silyl group,
(B) 0.1 to 50 parts by weight of a hydrolytic condensate of a reaction product and/or a mixture of a β-diketone with a mixture (b-1) containing a titanium tetraalkoxide and a metal alkoxide of the formula: M(OR)n wherein M is at least one metal selected from the group consisting of Zr, Fe, Al, Zn, In, Cu, Si, Sn, W, and Mg, n is the valence of said metal, and R is an alkyl group of 1 to 10 carbon atoms or hydrogen, and
(D) 1 to 200 parts by weight of colloidal silica.

20. A coating composition of claim 1, further comprising
100 parts by weight of an organosilicon compound having a hydrolysable group-bearing silyl group,
0.1 to 50 parts by weight of a hydrolytic condensate of a reaction product and/or a mixture of a β-diketone with a mixture (b-1) containing a titanium tetraalkoxide and a metal alkoxide of the formula: M(OR)n wherein M is at least one metal selected from the group consisting of Zr, Fe, Al, Zn, In, Cu, Si, Sn, W, and Mg, n is the valence of said metal, and R is an alkyl group of 1 to 10 carbon atoms or hydrogen, and
0.1 to 10 parts by weight of a photo-stabilizer having at least one cyclic hindered amine structure in a molecule.

* * * * *